Figure 1:
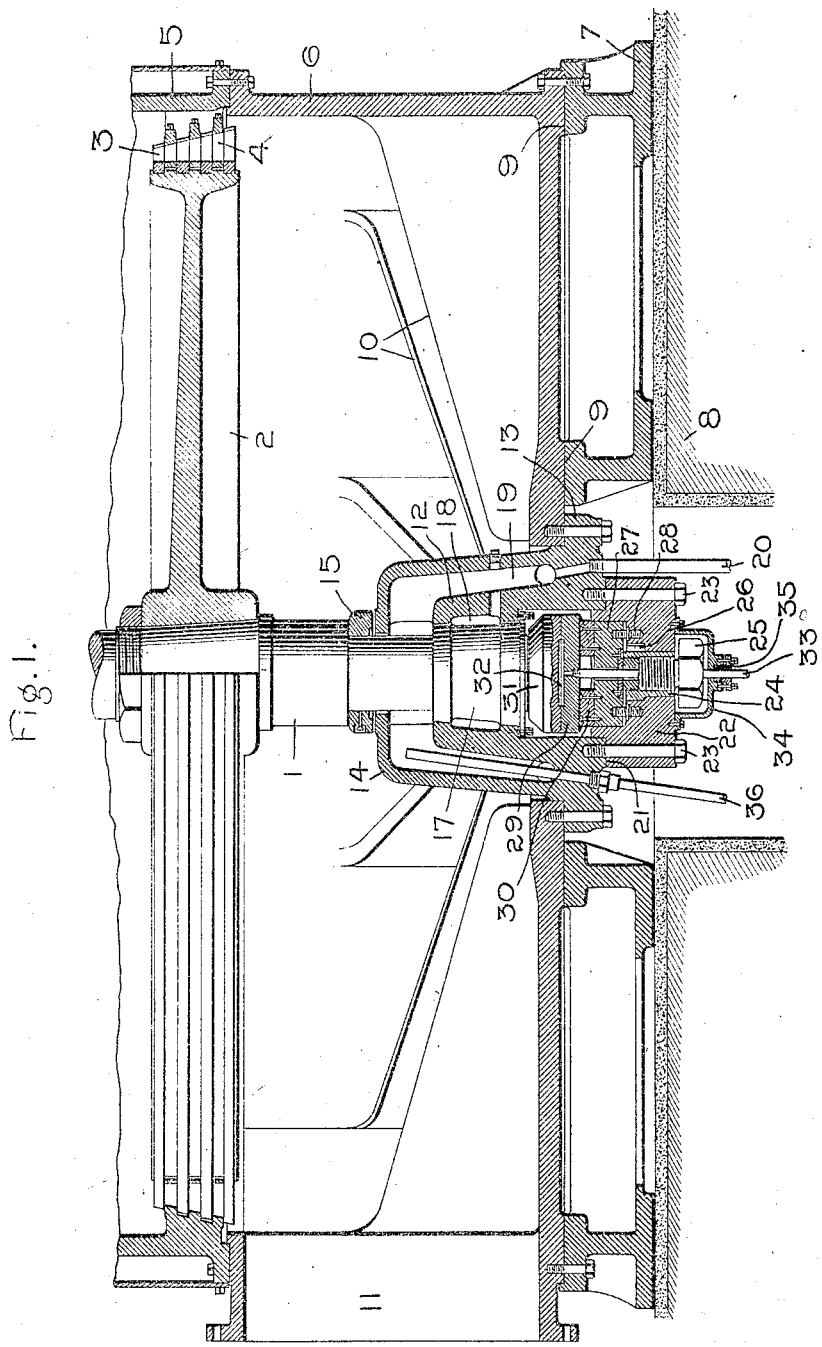

No. 874,947. PATENTED DEC. 31, 1907.
W. L. R. EMMET & O. JUNGGREN.
BEARING FOR ELASTIC FLUID TURBINES.
APPLICATION FILED JUNE 25, 1903.

3 SHEETS—SHEET 1.

Witnesses:
Marcus L. Byng.
Helen Orford

Inventors:
William L. R. Emmet,
Oscar Junggren,
by Albert G. Davis
Att'y.

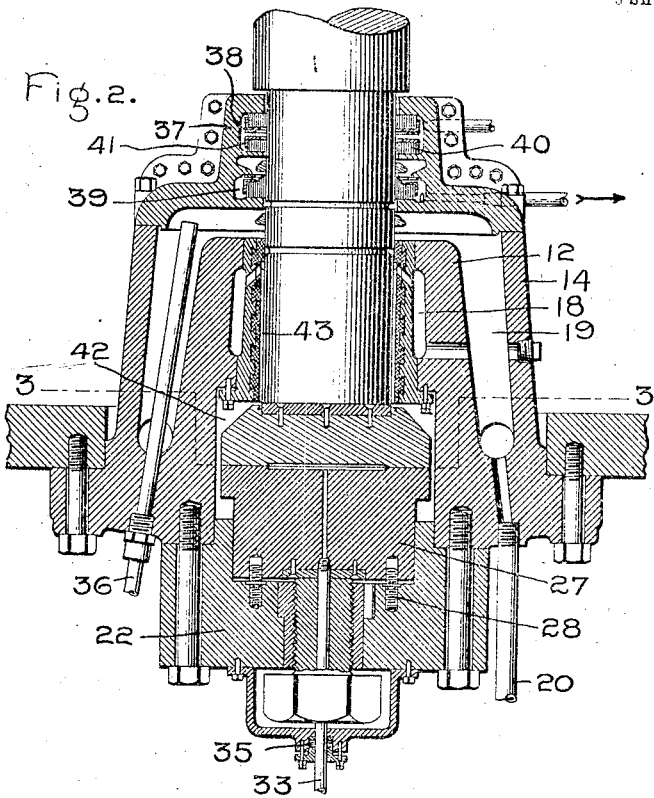
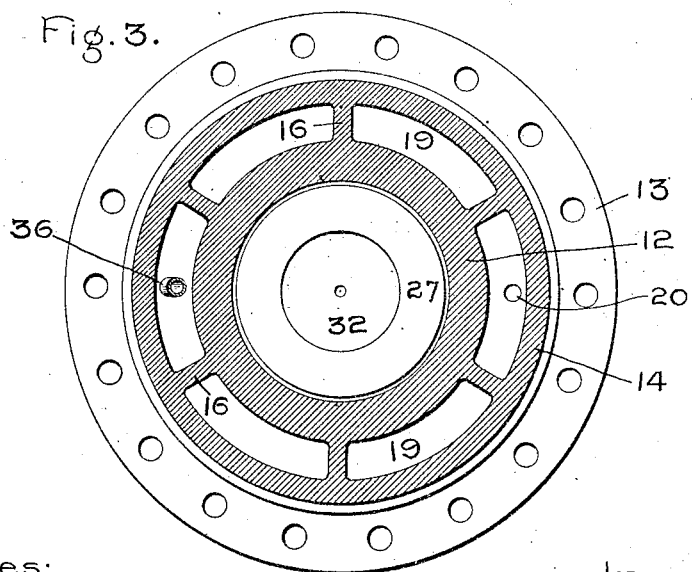

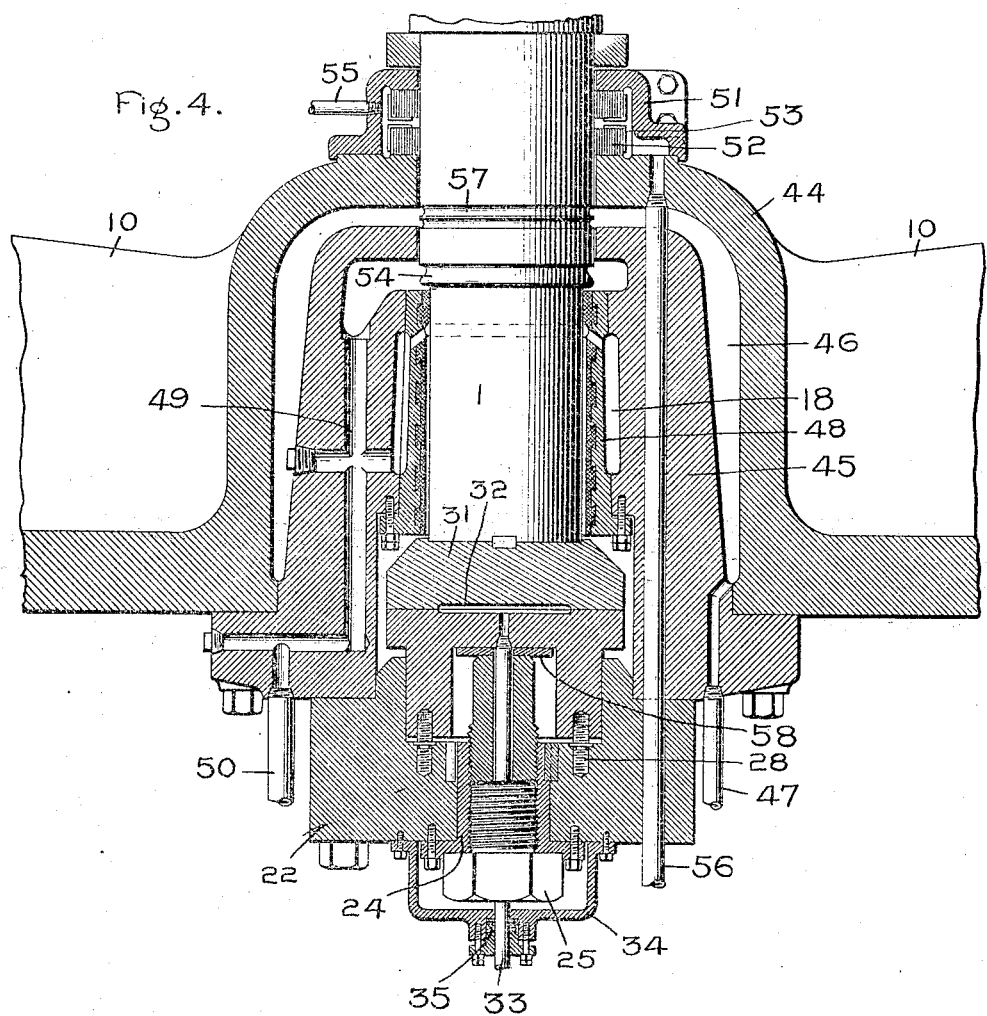

UNITED STATES PATENT OFFICE.

WILLIAM L. R. EMMET AND OSCAR JUNGGREN, OF SCHENECTADY, NEW YORK, ASSIGNORS TO GENERAL ELECTRIC COMPANY, A CORPORATION OF NEW YORK.

BEARING FOR ELASTIC-FLUID TURBINES.

No. 874,947.　　　　Specification of Letters Patent.　　　Patented Dec. 31, 1907.

Application filed June 25, 1903. Serial No. 163,060.

*To all whom it may concern:*

Be it known that we, WILLIAM L. R. EMMET and OSCAR JUNGGREN, citizens of the United States, residing at Schenectady, in the county of Schenectady and State of New York, have invented certain new and useful Improvements in Bearings for Elastic-Fluid Turbines, of which the following is a specification.

The present invention relates to bearings, and more especially to those used in elastic-fluid turbines; and has for its object to improve their construction whereby they are rendered more satisfactory and reliable in operation.

In the accompanying specification and claims appended thereto will be set forth with particularity and exactness what we consider to be novel and our invention.

In the accompanying drawings, which represent an embodiment of our invention, Figure 1 is a vertical section of the lower portion of an elastic-fluid turbine of the vertical type; Fig. 2 is a vertical section of the step bearing employed to support the main shaft; Fig. 3 is a cross-section taken on line 3 3 of Fig. 2; and Fig. 4 is a vertical section of a slightly modified form of bearing.

1 represents the main shaft of the turbine, which supports one or more wheels 2 that are provided with peripheral buckets 3. Between the wheel buckets are situated intermediate buckets 4 that receive the motive fluid from one set of buckets and after changing its direction discharge it at the proper angle against the buckets of an adjacent row. The bucket wheel is inclosed by a shell or casing 5 that also supports the intermediate buckets. This shell or casing is mounted on the base 6 which contains an exhaust chamber for receiving the motive fluid discharged by the wheel. The base is mounted on a sub-base 7 that in turn is supported by a masonry or other foundation 8, the latter being provided with a pit directly under the bearings so that they can be removed. The sub-base is cored or bored out in the center to receive the step bearing and its support and is provided with finished supporting surfaces 9 that engage corresponding surfaces on the under side of the base. The base is provided with a central opening having finished walls through which the step bearing projects.

It will be seen that the step and guide bearings are located within and rise above the bottom of the chambered base, and by reason of this construction the height of the turbine is reduced to a minimum. The bearing is also removable from the under side of the machine without in any way disturbing the operating parts. The base is strengthened by a number of radially-extending ribs 10. Steam or other motive fluid is discharged to the condenser through the opening or conduit 11.

The step bearing comprises a shell 12 that has a finished peripheral surface which engages with a corresponding surface on the base. It is also provided with a flange 13 which is bolted to the under side of the base. As many of these bolts are provided as are necesary to support the weight of the revolving structure, which frequently amounts to sixty-five or seventy tons. The joint between the shell and the base should be tight so as to prevent the admission of air to the base and the condenser. Surrounding the bearing shell is a casing 14 having a finished top. Situated above the top of the casing and engaging with a shoulder on the main shaft is a collar 15 which, when the step bearing is lowered, will support the weight of the revolving structure. When it is desired to remove the bearings a man enters the chamber in the base through a manhole and puts in blocks or wedges between the collar and the top of the casing which support the revolving structure when the step bearing is lowered.

The shell is arranged to support the steady or guide bearing 17. The latter may with advantage be lined with Babbitt metal or similar material and be secured to a flange on the shell by bolts. It is slightly larger at the bottom than the top to permit its removal from the under side of the shell. Surrounding the guide bearing is a chamber 18 which conveys lubricant from the bearing to the chamber 19 that is formed between the shell 12 and the inner wall of the casing 14. The chamber 19 acts as a drainage chamber and is connected by the pipe 20 with a suitable tank or other receiver which may with advantage be piped directly to the lubricating pump. The under side of the bearing shell is provided with a finished shoulder 21 with which the detachable plate 22 engages. This plate is secured to the shell by a plurality of bolts 23, as many of these bolts being employed as are necessary to support the weight of the moving parts. Mounted within the plate is a screw-threaded sleeve 24 which receives the adjusting bolt 25. The sleeve is prevented from turning by means of a key 26. The plate is hollowed out to receive the lower bearing block 27 which in the present form of the invention is made in two parts. The lower part of the block is provided with two or more openings to receive the screw-threaded guide pins 28 which prevent the block from rotating. It is also provided with a steel plate situated directly over and engaging with the adjusting bolt 25. The upper face of the lower half of the bearing block is spherical in form, and mounted thereon is the upper part 29 of the lower bearing block. The two parts of the block 27 and 29 are prevented from rotating independently of each other by the keys 30; the keys, however, are loosely fitted so that the spherical surfaces of the blocks will cause the parts to aline. Formed partly in the lower block 29 and partly in the upper block 31 which is attached to the main shaft, is a chamber 32 which receives fluid under pressure. The pressure on this chamber varies with the weight of the moving parts. In certain instances it is as high as 1500 pounds per square inch and in others much less. The pressure within the chamber plus the effective pressure of the lubricating fluid between the walls of the chamber and the periphery of the blocks is sufficient to support the weight of the moving member of the turbine, and in this way a thin film of oil or other lubricant is constantly maintained between the adjacent surfaces of the bearing when the machine is in operation. In order not to have an excessive fluid pressure on the bearing blocks, it is necessary to make their diameter somewhat greater than that of the end of the shaft. Fluid to the pressure-chamber 32 is conveyed by the pipe 33 which passes freely through the adjusting bolt and also through the parts 27 and 29 of the lower bearing block. The head of the adjusting bolt is inclosed by a cover 34 which is bolted to the supporting plate. The cover is provided with a packing 35 to prevent the admission of air around the high-pressure pipe, and the joint between the cover 34 and the supporting plate should also be made as nearly air-tight as possible. By the construction described the bolt 25 can be adjusted without disturbing the pressure pipe. The present bearing is intended to work in a vacuum, and in order to equalize the pressures between the drainage chamber 19 of the bearing and the suction side of the pump, an equalizing pipe 36 is provided which extends upward through the shell chamber to a point near the top. This pipe, in addition to serving as an equalizing means, also acts to prevent the lubricant from overflowing and entering the condenser casing in case the pipe 20 is choked.

Referring to Fig. 2, we have shown the parts on a somewhat larger scale and in addition have shown a packing for preventing the oil or other lubricant from working into the chamber of the base due to any cause. Instead of making the top of the casing solid it has been cut away and provided with a suitable cap 37 which is made in two or more pieces as is most convenient, and is secured to the casing by suitable bolts. The upper part of the cap has been extended so that it is in proximity to the shoulder formed on the main driving shaft and acts as a support for the revolving structure when the plate 22 is removed. The cap is provided with two chambers 38 and 39, and in the former two split carbon packing rings are provided, each of which has a metallic holder 41. The packing rings are normally held in the position shown by means of light springs, and steam is admitted to the chamber 38 under pressure. In the chamber 39 only one packing ring is shown. This is also made of carbon and is limited as to its vertical movement by suitable abutments. The water due to expansion and condensation drains from the upper to the lower chamber, and the water in passing is caught by the ring situated between the packings and discharged outwardly, after which it flows down the inclined wall of the lower chamber 39. Water or other fluid is discharged from the lower chamber by a drainage pipe, as is indicated by the arrow. This pipe is led out of the base in any convenient manner.

The arrangement of the chamber 18 in the guide bearing is more clearly illustrated in this figure. As the oil or other lubricant flows outward from the chamber 32 between the adjacent surfaces of the bearing blocks, it fills the chamber 42 in which the blocks are located and flows upward through the channels 43 in the lining of the guide bearing. These channels are connected with the chamber 18, and the latter connects with the drainage or collection chamber 19.

Instead of making the lower bearing block in two parts with a spherical surface between the parts, the lower block 27 is made in a single piece and arranged to fit snugly into the detachable plate 22. It is prevented from rotating by screw-threaded pins 28 and, as before, is removable with the plate.

In Fig. 3 is shown the upper face of the lower bearing block, the character of the upper surface and of the chamber being clearly illustrated. In order to strengthen the parts the shell 12 is connected with the casing 14 by a plurality of ribs 16.

Referring to Fig. 4, we have shown a slight modification of our invention wherein the center of the condenser exhaust receiving base is provided with an arch or dome 44 to which all of the radially-extending ribs 10 are attached. This arrangement greatly increases the strength of the structure, and the dome thus formed constitutes the casing for the bearing shell. Besides increasing the strength of the base this arrangement reduces the weight of the step bearing. The bearings are supported in a tubular shell 45 that is bolted to the under surface of the base. Between the outer wall of the shell and the inner wall of the arch or casing is a chamber 46 working under atmospheric pressure in which the oil or other lubricant leaking out of the bearings is collected. It is connected with a suitable reservoir or receptacle by a pipe 47. In this particular instance the bearing is working under atmospheric pressure instead of in a vacuum as in the previous illustrations. The shell 45 is bored out to receive the guide bearing 48 which is lined with Babbitt or similar metal. The bearing is secured in place by bolts which enter an internal shoulder formed on the sleeve. The chamber 18 which receives the lubricant after it passes through the guide bearing is partly formed in the guide bearing sleeve and partly in the main shell 45. On the left-hand side of the shaft is formed a passage 49 which communicates with the chamber 18 and discharges into the pipe 50. The pipe 50 may extend vertically or horizontally as is desired. This passage and pipe serve to return the lubricant to the suction side of the pump and also to prevent overflow. The upper end of the passage 49 communicates with a pocket located adjacent to the oil-throwing ring 54 formed on or carried by the main shaft so that any lubricant which works up through the guide bearing is prevented from entering the exhaust-receiving chamber.

Keyed to the lower end of the main shaft is the upper bearing block 31. It is provided with a horizontal bearing surface, and between it and the lower block is formed a pressure chamber 32. The lower block is arranged to make a snug fit with the detachable plate 22 and is cored out centrally to receive the upper end of the adjusting bolt 25. Between the bolt and the block is a steel plate 58. The bolt is mounted in a steel sleeve 24 which is provided with an outturned flange that is bolted to the under side of the plate 22. The bolt is surrounded by a cover 34 and at the point where the pressure pipe 33 passes through it a suitable packing is arranged. The upper end of the dome 44 is turned off true to receive the cap 51 which may be made in two or more pieces if desired. Within the cap is formed a chamber, and located therein are two carbon packing rings 52 which make a snug fit with the shaft and present a side to a stationary part of the structure. The rings are provided with metal holders 53 situated adjacent to each other, and are normally separated by one or more springs. In order to firmly hold the rings against their seats steam or other fluid under pressure is supplied to the chamber. This is done by means of a pipe 55. The water due to expansion and condensation is drained from the packing ring chamber by a pipe 56 which passes through an opening formed in the plate 22 and shell 45. Steam may be supplied to this pipe from the boiler through an ordinary reducing valve or in any suitable manner as, for example, from an intermediate stage working above atmospheric pressure. On the shaft are formed grooves 57 which tend to prevent the lubricant from working up through into the exhaust chamber. The pressure to which the packing rings are subjected depends upon the conditions of operation, but it should be sufficient to prevent lubricant from working from the bearings into the condenser chamber.

When it becomes necessary to adjust the bearing, the cover 34 is removed and the bolt rotated in one direction or the other, which moves the bearing blocks and also the main shaft up or down, depending on which way the bolt is rotated. After it has been rotated to the desired position it is clamped in place by suitable means to prevent it from changing its position.

In accordance with the provisions of the patent statutes, we have described the principle of operation of our invention, together with the apparatus which we now consider to represent the best embodiment thereof; but we desire to have it understood that the apparatus shown is only illustrative and that the invention can be carried out by other means.

What we claim as new, and desire to secure by Letters Patent of the United States, is,—

1. In a step bearing for a turbine, the combination of a shaft, a chambered base, a shell which is detachably secured to the under side of and rises above the level of the base, a step and a guide-bearing mounted in the shell, and means for conveying lubricant under pressure to the step-bearing.

2. In a step bearing for a turbine, the combination of a shaft, a chambered base, a shell which is detachably secured to the under side of and rises above the level of the base, a bearing block which is attached to the end of the shaft, a second bearing block in line with the first and supported by the shell, there being a chamber formed between the blocks, and a means for delivering a lubricating fluid to the chamber under pressure for supporting the wheel shaft and maintaining a lubricating film between the adjacent surfaces of the blocks.

3. In a step bearing for a turbine, the combination of a shaft, a chambered base, a shell which is detachably secured to the under side of and rises above the bottom of the base, a detachable plate secured to the shell, a bearing block secured to the end of the shaft, a second block supported by the plate and secured against rotation, means for maintaining a film of lubricant between the adjacent surfaces of the bearing blocks, and a means for adjusting the shaft longitudinally.

4. In a step bearing for a turbine, the combination of a shaft, a chambered base, a shell which is detachably secured to the under side of the base, a guide-bearing carried by the upper part of the shell, a bearing block secured to the lower end of the shaft, a plate detachably secured to the lower part of the shell, a bearing block supported by the plate, an adjusting means passing through the plate and sustaining the weight on the lower bearing block, and a means for preventing the lower block from turning.

5. In a step bearing for a turbine, the combination of a shaft, a chambered base, a shell which is secured to the base, a bearing block that is attached to the end of the shaft, a second bearing block in line with the first, a plate secured to the shell for supporting the second block, an adjusting device for the second block which passes through the plate, and a means for conveying lubricant through the adjusting device for lubricating the adjacent surfaces of the blocks.

6. In a step bearing for a turbine, the combination of a shaft, a chambered base, a shell which is secured to the base, a bearing block that is attached to the end of the shaft, a second bearing block in line with the first, a plate secured to the shell for supporting the second block, an adjusting device for the second block which passes through the plate, a wearing plate located between the end of the adjusting device and the second block, and a means for maintaining a film of lubricant between adjacent surfaces of the block.

7. In a step bearing for a turbine, the combination of a shaft, a chambered base, a shell which is secured to the base, a bearing block that is attached to the end of the shaft and is inclosed by the shell, a second bearing block in line with the first, a plate secured to the shell for supporting the second block, an adjusting device for the second block, a detachable screw-threaded sleeve that is mounted in the plate and carries the adjusting device, and means for preventing the rotation of the lower block.

8. In a step bearing for a turbine, the combination of a shaft, a chambered base, a shell which is secured to and projects into the base, a casing which surrounds the shell, a drainage chamber formed between the shell and casing, bearing blocks for supporting the shaft, a means for maintaining a film of lubricant between adjacent surfaces of the blocks, a conduit for draining the chamber, and a means for equalizing the pressures of the source of supply and the chamber.

9. In a step bearing for a turbine, the combination of a shaft, a chambered base, a shell which is secured to and projects into the base, a casing which surrounds the shell, a drainage chamber formed between the shell and casing, bearing blocks for supporting the shaft, a means for maintaining a film of lubricant between adjacent surfaces of the blocks, and a packing which is supported by the casing and surrounds the shaft.

10. In a step bearing for a turbine, the combination of a shaft, a chambered base, a shell which is secured to and projects into the base, a casing which surrounds the shell, a drainage chamber formed between the shell and casing, bearing blocks for supporting the shaft, a means for maintaining a film or lubricant between adjacent surfaces of the blocks, and a packing comprising a body of carbon which surrounds the shaft and is supported by the casing and prevents the lubricant from mingling with the vapor in the chamber in the base.

11. In a step bearing for a turbine, the combination of a shaft, a chambered base, a shell which projects above the under side of the base, a casing which incloses the shell and is formed integral with the base, a detachable plate, means for securing the plate to the shell, there being a shoulder formed between the plate and shell to prevent independent lateral motion, a movable bearing block which is guided by the plate, means which permit the block to be adjusted longitudinally but prevent it from rotation, and a second bearing block in line with the first.

12. In a step bearing for a turbine, the combination of a shaft, a chambered base, a shell which projects above the under side of the base, a casing which incloses the shell and is formed integral with the base, a detachable plate, means for securing the plate to the shell, and a step bearing carried by the shell.

13. In a step bearing for a turbine, the combination of a shaft, a chambered base, a shell which projects above the under side of the base, an inclosure or casing for the shell which forms a strengthening arch of the base, ribs on the base which are connected to the inclosure or casing, and bearing blocks carried by the shell for supporting the bucket-wheel shaft.

14. In a step bearing for a turbine, the combination of a shaft, a chambered base, a shell which projects above the under side of the base, an inclosure or casing for the shell which forms a strengthening arch for the base, a packing supported by the casing, there being a conduit which passes through the shell for supplying fluid under pressure to the packing, and bearing blocks supported by the shell.

15. In combination, a shell, a plate supported thereby, a bearing block mounted on the plate, a means engaging with the center of the block for adjusting it, and a conduit which freely passes through the adjusting device and is attached to the block for lubricating it.

16. In combination, a shaft, a shell which surrounds one of its ends, a step-bearing block supported by the shell, a guide-bearing situated above the step-bearing, and a means for supplying lubricant to the step-bearing under pressure, there being channels for conveying lubricant to the guide-bearing after it has passed through the step-bearing.

17. In combination, a shaft, a shell which incloses one end thereof, a step-bearing mounted in the shell, an adjusting device for the bearing, a fluid-carrying conduit which passes freely through the device into the bearing, and a cap which incloses the end of the adjusting device and prevents the entrance of air or the exit of fluid.

18. In combination, a shaft, a shouldered shell which incloses one end thereof, a support to which the shell is secured, a plate which is detachably secured to the under side of the shell, a step-bearing supported by the plate and removable therewith, and a guide-bearing which is attached to the shell and is removable from the under side.

19. In combination, a support, a shaft, a shell which is attached to the support, a step-bearing mounted on the shell, an adjusting device for the bearing, and a means for conveying lubricant to the adjacent surfaces of the bearing, which passes through the adjusting device.

20. In a step bearing for a turbine, the combination of a shaft, a chambered base, a shell which is secured to and projects into the base, a casing which surrounds the shell, there being a drainage chamber formed between the shell and casing, bearing blocks for supporting the shaft, a means for maintaining a film of lubricant between adjacent surfaces of the blocks, and a conduit for draining the chamber.

21. In a bearing for a turbine, the combination of a shaft, a chambered base, a guide bearing for the lower end of the shaft, a step bearing for supporting the weight of the shaft, which is located within the base and forms a seal to prevent the entrance of air, and a conduit for supplying lubricant under pressure to the step bearing.

22. In a bearing for a turbine, the combination of a shaft, a chambered base, a guide bearing for the lower end of the shaft, which is supported by the base, a step bearing for the shaft comprising relatively movable blocks with a chamber between them, a means for adjusting the lower block, and a support for the lower block, which is attached to the chambered base.

23. In a bearing for a turbine, the combination of a shaft, a chambered base, a guide bearing for the lower end of the shaft, which is supported by the base, a step bearing for the shaft comprising a pair of blocks and a support, the latter being attached to the base, a conduit for supplying lubricant to maintain a film between the blocks, and means for conveying lubricant exhausting from the step to the guide bearing.

24. In a bearing for a turbine, the combination of a shaft, a base for the turbine, a guide bearing for the shaft, a step bearing for the shaft, and a support which is common to both bearings, incloses the end of the shaft and is itself attached to the base so that said bearings can be mounted in place or removed as a unit.

25. In a bearing for a turbine, the combination of a shaft, a base for the turbine, a guide bearing for the lower end of the shaft, a support for the bearing, which is attached to the base and incloses the end of the shaft, a step bearing situated at the end of the shaft, and a plate for supporting the step bearing, which is attached to the support which carries the guide bearing.

26. In a bearing for turbines, the combination of a base, a shaft, step-bearing blocks located at the end of the shaft, a guide-bearing, the wearing surfaces of the blocks and the guide-bearing being at right angles to each other, a support that incloses one end of the shaft and supports the blocks and bearing so that they can be mounted in place or removed as a unit, and means for attaching the support to the base.

27. In a bearing for turbines, the combination of a base, a shaft, step and guide bearings, the wearing surfaces of which are located at right angles to each other, a support which is common to the bearings, means for attaching the support to the base, and a conduit for conveying lubricant to the step bearing from which it flows to the guide bearing, there being a passage which receives the lubricant after passing through the bearings.

28. In a bearing for a vertical shaft, the combination of a step bearing block which is attached to the shaft, a second block located under the first for supporting the weight of the shaft and attached parts, a support, a plate detachably secured to the support, which receives the lower block and prevents it from turning, a guide bearing which is situated above the step bearing, and means for conveying lubricant to the step bearing, there being one or more passages for conveying exhaust lubricant from the step to the guide bearing.

29. In a bearing for a vertical shaft, the combination of a step bearing block which is attached to the shaft, a second block located under the first for supporting the weight of the shaft and attached parts, a support, a plate detachably secured to the support that contains an opening to receive and guide the lower block, means attached to the plate for preventing the lower block from turning, a device for adjusting the vertical position of the lower block, a guide bearing situated in line with the step bearing, and a means for lubricating the step and guide bearings.

30. In a step-bearing for a turbine, the combination of a shaft, a support, a bearing block attached to the shaft, a second block in line with the first and normally separated therefrom by a body of lubricant, a guide for the lower block, a means carried by the support which sustains the load on the lower block, and a conduit for supplying lubricant to the opposed surfaces of the blocks.

31. In combination, an apertured wall the opposite sides of which are subjected to different pressures, a casing located in line with the aperture in the wall and inclosing one end of the shaft, a shaft extending into the casing, step- and guide-bearings for the shaft which are located within the casing, means for maintaining a forced flow of lubricant through both bearings, and a packing around the shaft and supported on the casing which prevents the lubricant from leaking from the casing.

In witness whereof we have hereunto set our hands this 24th day of June 1903.

WILLIAM L. R. EMMET.
OSCAR JUNGGREN.

Witnesses:
BENJAMIN B. HULL,
HELEN ORFORD.